BEST AVAILABLE COPY

UNITED STATES PATENT OFFICE

ELIZABETH BELLINGER, OF MOHAWK, NEW YORK.

IMPROVEMENT IN COMPOSITION FOR KINDLING FIRE.

Specification forming part of Letters Patent No. 26,408, dated December 13, 1859; Reissue No. 2,326, dated August 7, 1866.

*To all whom it may concern:*

Be it known that I, Mrs. ELIZABETH BELLINGER, of Mohawk, in the county of Herkimer and State of New York, have invented a new and useful Self-Lighting Fire-Kindler; and I do hereby declare that the following is a full, clear, and exact description thereof, which will enable those skilled in the art to make and use the same.

The object of this improvement is to facilitate the ignition of fire-kindling materials, and especially of composite fire-kindling materials, such as are described in the Letters Patent granted to me December 1, 1857.

The immediate agent which I use to ignite the fire-kindling is match-paste, which I deposit upon any convenient place upon the fire-kindler, and whenever friction is applied to the match-paste it will instantly ignite and set fire to the kindling material. A fire-kindler thus made I denominate a "self-lighting fire-kindler."

If the original substances composing the fire-kindler are not in their nature sufficiently inflamable to take fire readily when the match-paste upon them is ignited, I increase their inflammability by depositing upon such materials, in connection with the match-paste, a small quantity of a very inflammable adhesive or gum paste, which paste will readily take fire when the match-paste is ignited, and thus insure the ignition of the whole of the kindling material. This also forms a self-lighting fire-kindler.

Having already described the method of applying the match-paste, I will now describe the method of making and applying the gum paste.

I take kauri gum, eight parts by weight, crude camphor, four parts by weight, and pulverize them in any known way, such as by pounding the kauri gum in a mortar and rolling the camphor with a pin on a board. I now mix these two substances together and stir them among two parts, by weight, of melted beeswax or myrtle-wax in a suitable vessel until the whole is well incorporated together. Care must be exercised not to have the melted wax too hot; and to prevent this result I place the wax in a warm-water bath, when the gums are stirred in. When these substances are thus completely mixed the paste so formed is ready for use. I color it with vermilion or any fancy color mixed with spirits of turpentine, and sometimes add a little balsam of Folu to impart a fragrant odor to the gum when kindled; but these are not essential. This gum paste in its soft state is now put on the common blocks of manufactured kindling material in small spots, one on each kindler, and in a suitable place, and then on the top of this gum paste, or in close connection therewith, the match-paste is placed in spots, drops, or patches in a similar manner.

When dry the kindlers so made are ready for use as follows: Take a piece of sand-paper or other like material and rub it rapidly across the surface of the match-paste, which thereby ignites, and its heat quickly kindles the inflammable gum-paste composition described, which inflames the kindler-block with certainty in all cases.

The wax enables the inflammable gums to adhere to the kindler-block, and it also protects them and preserves their properties, as it is a most efficient antiseptic.

The materials of which the kindler-block is made need not be described, as they are well known, being composed of sawdust and other substances agglutinated together with resin, as described in my said patent of 1857.

The friction-match paste need not be particularly described, as it is well known, and may be made of niter, peroxide of lead, and chlorate of potash; but I prefer to use that which L. Bellinger & Co. employ on their matches without sulphur. My gum paste is suitable for any of the friction-match-paste compositions that may be used.

Having thus described my invention, I claim as new and desire to secure by Letters Patent as an improved article of manufacture—

A self-lighting fire-kindler made substantially as herein described.

ELIZABETH BELLINGER.

Witnesses:

WM. F. MCNAMARA,

A. E. BEACH.